US006657633B1

(12) United States Patent
Casey

(10) Patent No.: US 6,657,633 B1
(45) Date of Patent: Dec. 2, 2003

(54) DMA COMPUTER SYSTEM FOR DRIVING AN LCD DISPLAY IN A GPS RECEIVER

(75) Inventor: David Casey, Shawnee Mission, KS (US)

(73) Assignee: Garmin International, Inc, KS (US)

( * ) Notice: Subject to any disclaimer, the term of this patent is extended or adjusted under 35 U.S.C. 154(b) by 438 days.

(21) Appl. No.: 09/665,538

(22) Filed: Sep. 19, 2000

(51) Int. Cl.[7] .................................................. G06T 1/60

(52) U.S. Cl. ......................... 345/530; 345/538; 710/22; 711/112

(58) Field of Search ................................. 345/530, 538, 345/574; 710/22–28; 709/212; 711/100, 106, 112; 710/100

(56) References Cited

U.S. PATENT DOCUMENTS

| | | | | |
|---|---|---|---|---|
| 5,467,274 | A | * | 11/1995 | Vax |
| 5,668,568 | A | * | 9/1997 | Holloman |
| 5,706,478 | A | | 1/1998 | Dye |
| 5,732,284 | A | * | 3/1998 | Kono |
| 5,859,649 | A | | 1/1999 | Yiu et al. |
| 5,914,699 | A | | 6/1999 | Imamura |
| 5,968,145 | A | * | 10/1999 | Maeda et al. |
| 5,977,937 | A | | 11/1999 | Michaelis |
| 6,463,482 | B1 | * | 10/2002 | Yasuhara |

FOREIGN PATENT DOCUMENTS

| | | |
|---|---|---|
| JP | 9800233 | 1/1998 |

* cited by examiner

*Primary Examiner*—Matthew C. Bella
*Assistant Examiner*—Han Nguyen
(74) *Attorney, Agent, or Firm*—Devon A. Rolf

(57) ABSTRACT

A DMA computer system (10) for driving a peripheral device such as an LCD display (12) of a GPS receiver without stealing excessive cycles from a CPU (18). The DMA computer system (10) includes a CPU (18), a first memory (20) that may be written to or read by the CPU (18), a second memory (22) that may be written to or read by the CPU (18), and a DMA controller (24) coupled with the CPU (18) and the second memory (22). The DMA controller (24) is operable to: read data from the second memory (22) and transfer the data to the peripheral device; delay the CPU (18) from accessing the second memory (22) while the DMA controller (24) is reading data from the second memory (22); enable the CPU (18) to regain access to the second memory (22) once the DMA controller (24) has finished reading data from the second memory (22); and allow the CPU (18) to access the first memory (20) without delay even while the DMA controller (24) is reading data from the second memory (22).

16 Claims, 1 Drawing Sheet

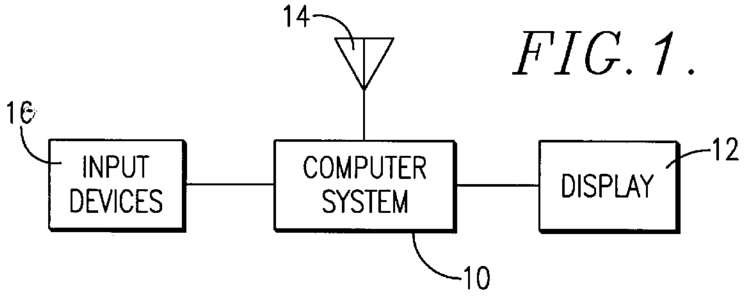
FIG. 1.
FIG. 2.
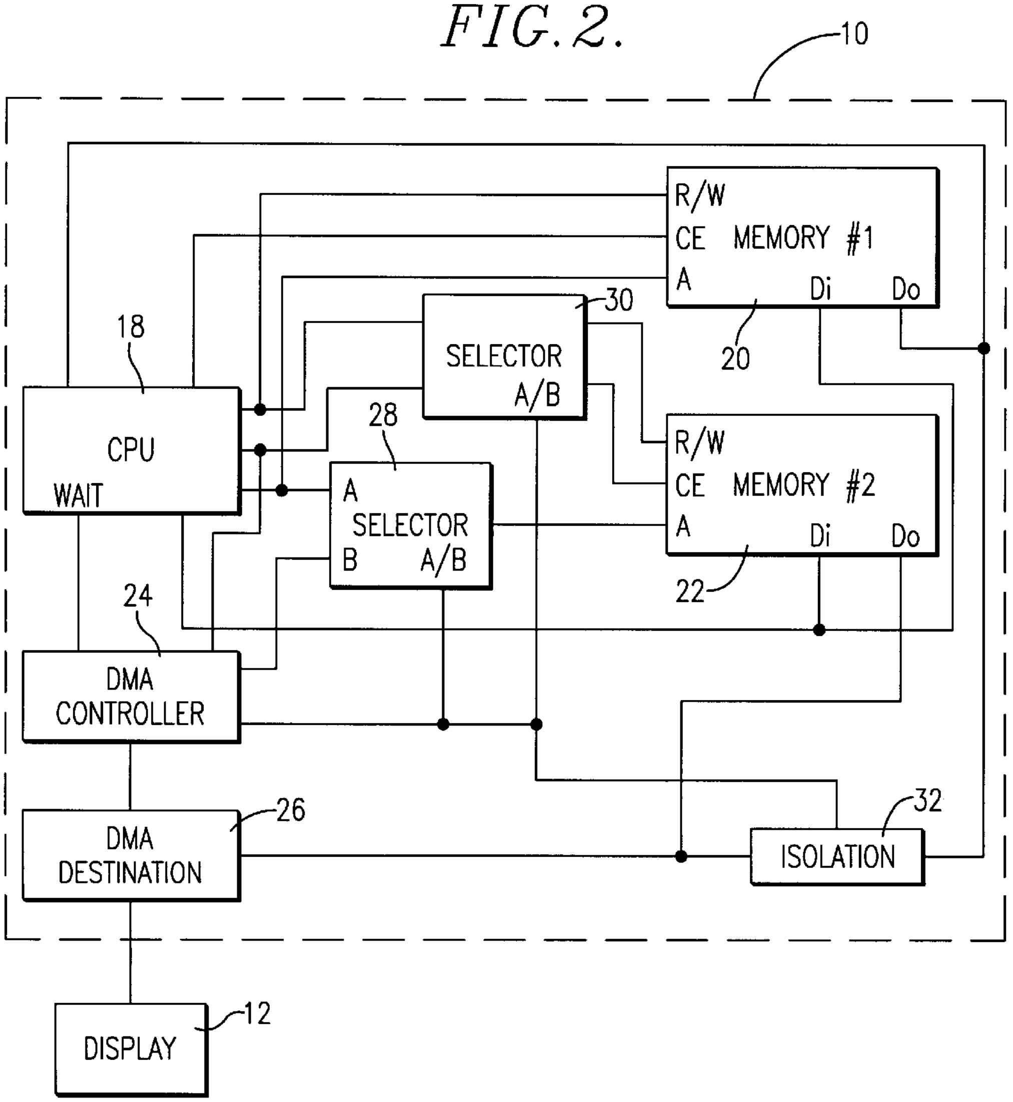

DMA COMPUTER SYSTEM FOR DRIVING AN LCD DISPLAY IN A GPS RECEIVER

BACKGROUND OF THE INVENTION

1. Field of the Invention

The present invention relates to direct memory access (DMA) computer systems. More particularly, the invention relates to a DMA computer system for driving an LCD display in a GPS receiver.

2. Description of the Prior Art

DMA controllers are frequently used in computer systems for transferring blocks of data between the computer system's main memory and a peripheral device without burdening the computer system's CPU. DMA controllers are advantageous because they allow the CPU to continue executing other programs and control functions while the DMA controller drives the peripheral device.

In conventional DMA computer systems, the DMA controller takes control of the address, control, and data buses of the computer system when transferring data to a peripheral device. This can slow the CPU because the DMA controller competes with the CPU for instruction fetches and memory access. This problem is commonly referred to as "cycle stealing."

Cycle stealing is particularly a problem in computer systems that use DMA controllers to drive peripherals that require a high average data rate. For example, in GPS receivers, DMA controllers are commonly used to drive LCD displays. LCD displays used in newer GPS receivers are larger and require a higher refresh rate, thus requiring their DMA controllers to steal more CPU cycles.

Solutions to cycle stealing, such as using dual-port RAMs or dedicated LCD controllers with internal memory for use as refresh buffers, have been developed. However, these solutions require relatively complex and expensive circuitry and/or memory devices and are therefore less desirable for many applications such as relatively low-cost GPS receivers.

SUMMARY OF THE INVENTION

The present invention solves the above-described problems and provides a distinct advance in the art of DMA computer systems. More particularly, the present invention provides a DMA computer system for driving a peripheral device such as an LCD display of a GPS receiver without stealing excessive cycles from the CPU and therefore overly slowing the CPU. The present invention also provides such a DMA control system that is relatively simple and economical to manufacture particularly when the memory for the DMA is integrated with the CPU and DMA controller and therefore suitable for many applications.

The DMA computer system of the present invention broadly includes a CPU, a first memory that may be written to or read by the CPU, a second memory that may be written to or read by the CPU, and a DMA controller coupled with the CPU and the second memory. The DMA controller is operable to: read data from the second memory and transfer the data to the peripheral device; delay the CPU from accessing the second memory while the DMA controller is reading data from the second memory; enable the CPU to regain access to the second memory once the DMA controller has finished reading data from the second memory; and allow the CPU to access the first memory without delay even while the DMA controller is reading data from the second memory.

One preferred application of the DMA computer system is for driving and/or refreshing an LCD display of a GPS receiver. Much of the data that the CPU requires for normal operation of the computer system and most of the instruction fetches are stored in the first memory. Data necessary to drive and/or refresh the display is stored in the second memory. To drive and/or refresh the display, the DMA controller transfers data from the second memory to the LCD display and temporarily delays the CPU any access to the second memory by suppressing the clock of the CPU until the DMA cycle is completed. During a DMA read, the CPU may continue operating in a normal fashion and may retrieve data and instructions from the first memory without delay.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 1 is a high level block diagram of a GPS receiver incorporating the DMA computer system of the present invention.

FIG. 2 is a more detailed block diagram of the DMA computer system.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to FIGS. 1 and 2, a DMA computer system 10 constructed in accordance with a preferred embodiment of the present invention is illustrated. As illustrated in FIG. 1, one preferred application for the DMA computer system is for driving or refreshing a display 12 such as an LCD in a GPS receiver. The GPS receiver, which is entirely conventional except for the DMA control system 10, also includes an antenna 14 for receiving GPS signals from one or more GPS satellites, one or more input devices 16 such as a keypad and/or scrolling buttons, and other conventional electronics and programs (not shown) for analyzing the GPS signals and determining location information therefrom. The preferred GPS receiver is manufactured and sold by Garmin International, Inc. of Olathe, Kans.

The DMA computer system controls 10 operation of the GPS receiver in a conventional manner and also drives and/or refreshes the display 12 as described herein. Referring to FIG. 2, the preferred DMA computer system 10 broadly includes a CPU 18, a first memory 20, a second memory 22, a DMA controller 24, a DMA destination device 26, a selector 28, a selector 30, and a data bus isolation gate 32. The computer system 10 preferably has a shared bus for instructions and data. The CPU 18, the second memory 22, the DMA controller 24, and the DMA destination device 26 are preferably integrated on one chip with other peripherals and GPS signal processing circuitry.

The CPU 18 is entirely conventional and is provided for controlling operation of the other components of the computer system 10. The CPU 18 is preferably the same type of CPU found in conventional GPS receivers such as those manufactured and sold by Garmin International, Inc. referred to above.

The first memory 20 is provided for storing data that is commonly written or read by the CPU 18 while carrying out conventional control functions of the GPS receiver. For example, the first memory 20 preferably stores all instruction fetches and data that the CPU 18 needs to access for operating the GPS receiver but does not store data necessary to drive and/or refresh the display 12. The first memory 20 preferably consists of one or more blocks of RAM on a chip but may also comprise any other type of conventional memory device. In one preferred embodiment of the present invention, the first memory 20 consists of RAM on the chip, ROM on the chip, and off chip memory that may be FLASH, RAM, and/or ROM.

The second memory 22 is provided for storing data that is needed to drive and/or refresh the display 12. Data that may be frequently accessed by the CPU 18 for normal operation of the G PS receiver is preferably not stored on the second memory 22, but is rather stored on the first memory 20 as described above. The second memory 22 preferably consists of one or more blocks of RAM on a chip but may also comprise any other type of conventional memory device. In one preferred embodiment of the present invention, the second memory consists of two, 16-bit wide blocks of RAM on the chip. The specific type and size of the first and second memory 20 22 are not critical and do not limit the scope of the present invention.

The DMA controller 24 is coupled with the CPU 18 and the second memory 22 for transferring data from the second memory 22 to the DMA destination 26 for delivery to a peripheral device such as the LCD display 12. The DMA controller 24 includes a DMA address generator and a timing controller. The DMA destination 26 is preferably an LCD controller, data latch or other type of peripheral device controller.

The selector 28 is coupled between the address line of the second memory 22 and the CPU 18 and DMA controller 24 as illustrated. The selector 28 is controlled by the DMA controller 24 so as to connect either the CPU 18 or the DMA controller 24 to the address line of the second memory 22 as described in more detail below.

The selector 30 is coupled between the CPU 18 and read and chip select lines of the second memory 22 as illustrated. The selector 30 is controlled by the DMA controller 24 to force the second memory 22 to a read state when the DMA controller 24 is reading data from the second memory 22 as described in more detail below.

The data bus isolation gate 32 is interposed in the data bus of the computer system 10 and is provided for isolating the data lines of the second memory 22 from the CPU 18 when the DMA controller 24 is reading data from the second memory 22. The data bus isolation gate 32 allows the second memory 22 to drive the data bus normally when the DMA controller 24 is not reading data from the second memory 22 as described in more detail below.

In operation, the DMA computer system 10 operates the GPS receiver in a conventional manner while permitting the DMA controller 24 to drive and/or refresh the display 12. Specifically, the CPU 18 may read data from or write data to either the first memory 20 or the second memory 22 in a conventional manner whenever the DMA controller 24 is not attempting to transfer data from the second memory 22 to the display 12. When the DMA controller 24 and CPU 18 attempt to read data from the second memory 22 at the same time, it first delays completion of the CPU's access to the second memory 22. The DMA controller 24 preferably accomplishes this by transmitting a "wait" signal to the CPU 18 to suppress the clock of the CPU 18 until the DMA controller 24 has completed a cycle. The DMA controller 24 monitors CE2 from the CPU 18 to detect if the CPU 18 is addressing the second memory. The DMA controller 24 is preferably designed to read one word at a time from the second memory 22 to avoid delaying the CPU 18 for more than one clock cycle at a time.

During a DMA read, the DMA controller 24 also controls the selectors 28, 30 and the data bus isolation gate 32 to prevent a conflict between the CPU 18 and the DMA controller 24. Particularly, the DMA controller 24 switches the selector 28 during a DMA read so that the address line of the second memory 22 is connected to the DMA controller 24 rather than the CPU 18. This permits the DMA controller 24 to select the address of the data that is to be read from the second memory 22 and transferred to the display 12.

The DMA controller 24 also switches the selector 30 during a DMA read to force the second memory 22 to a read state. This prevents the CPU 18 from writing data to the second memory 22 while the DMA controller 24 is transferring data to the display 12.

Finally, the DMA controller 24 controls the data bus isolation gate 32 to isolate the data lines of the second memory 22 from the CPU 18 during a DMA read. This prevents the data from the second memory 22, during a DMA read, from interfering with data which may be read from the first memory 20 at the same time.

Once the DMA controller 24 has completed a read cycle, it reenables the clock of the CPU 18 so that the CPU 18 may complete a memory access of the second memory 22. The DMA controller 24 also switches or controls the selectors 28, 30 and the data bus isolation gate 32 to connect the address line of the second memory 22 back to the CPU 18, to allow the CPU 18 to control the read/write signals of the second memory 22 in a conventional manner, and to allow the second memory 22 to drive the data bus in a normal fashion.

Thus, the DMA controller 24 and other components of the DMA computer system 10 operate to: read data from the second memory 22 and transfer the data to the display 12 or other peripheral device; delay the CPU 18 from accessing the second memory 22 while the DMA controller 24 is reading data from the second memory 22; enable the CPU 18 to regain access to the second memory 22 once the DMA controller 24 has finished reading data from the second memory 22; and allow the CPU 18 to access the first memory 20 without delay even while the DMA controller 24 is reading data from the second memory 22. Importantly, the DMA controller 24 does not take over the CPU's address and data bus and therefore does not compete with instruction fetches and memory accesses to the first memory 20.

The DMA controller 24 may also be configured to write data to the second memory 22. In this embodiment, a selector or other means must be provided to select data from a DMA channel to the data input bus of the second memory 22 during a DMA write cycle.

Although the invention has been described with reference to the preferred embodiment illustrated in the attached drawing figures, it is noted that equivalents may be employed and substitutions made herein without departing from the scope of the invention as recited in the claims. For example, although the preferred implementation of the DMA computer system of the present invention is for driving and/or refreshing an LCD display of a GPS receiver, the DMA computer system may also be used in other applications to transfer data to or from other peripheral devices.

Having thus described the preferred embodiment of the invention, what is claimed as new and desired to be protected by Letters Patent includes the following:

1. A computer system for transferring data to a peripheral device, the computer system comprising:

a CPU;

a first memory that may be written to or read by the CPU;

a second memory that may be written to or read by the CPU; and a DMA controller coupled with the CPU and the second memory, the DMA controller being operable to:

read data from the second memory and transfer the data to the peripheral device, delay the CPU from accessing the second memory, by suppressing a clock of the CPU, while the DMA controller is reading data from the second memory, enable the CPU to regain access to the second memory once the DMA controller has finished reading data from the second memory, and allow the CPU to access the first memory without delay even while the DMA controller is reading data from the second memory.

2. The computer system as set forth in claim 1, the peripheral device including a display controller and a display.

3. The computer system as set forth in claim 1, further including a selector coupled between an address line of the second memory and the CPU and the DMA controller, the selector being controlled by the DMA controller to connect either the CPU or the DMA controller to the address line.

4. The computer system as set forth in claim 1, further including:

a data bus for transferring data between the CPU and the first memory and the second memory; and a data bus isolation gate for isolating data lines of the second memory device from the CPU when the DMA controller is reading data from the second memory.

5. The computer system as set forth in claim 1, further including a selector coupled between the CPU and a read/write line of the second memory, the selector being controlled by the DMA controller to force the second memory to a read state when the DMA controller is reading data from the second memory.

6. The computer system as set forth in claim 2, the CPU, the second memory, the DMA controller, and the display controller being integrated on a single chip.

7. The computer system as set forth in claim 1, wherein the first memory and the second memory are formed on separate blocks of RAM.

8. The computer system as set forth in claim 1, wherein the first memory and the second memory are formed on a single block of RAM that is partitioned into first and second portions.

9. GPS receiver comprising:

an antenna for receiving GPS signals from a plurality of GPS satellites;

a CPU coupled with the antenna for processing the GPS signals to determine location information for the GPS receiver;

a display coupled with the CPU for displaying at least a portion of the location information;

a first memory that may be written to or read by the CPU;

a second memory that may be written to or read by the CPU; and a DMA controller coupled with the CPU and the second memory, the DMA controller being operable to:

read data from the second memory and transfer the data to the display, delay the CPU from accessing the second memory, by suppressing a clock of the CPU, while the DMA controller is reading data from the second memory, enable the CPU to regain access to the second memory once the DMA controller has finished reading data from the second memory, and allow the CPU to access the first memory without delay even while the DMA controller is reading data from the second memory.

10. The GPS receiver as set forth in claim 9, further including a selector coupled between an address line of the second memory and the CPU and the DMA controller, the selector being controlled by the DMA controller to connect either the CPU or the DMA controller to the address line.

11. The GPS receiver as set forth in claim 9, further including:

a data bus for transferring data between the CPU and the first memory and the second memory; and a data bus isolation gate for isolating data lines of the second memory device from the CPU when the DMA controller is reading data from the second memory.

12. The GPS receiver as set forth in claim 9, further including a selector coupled between the CPU and a read/write line of the second memory, the selector being controlled by the DMA controller to force the second memory to a read state when the DMA controller is reading data from the second memory.

13. The GPS receiver as set forth in claim 9, further including a display controller for driving the display.

14. The GPS receiver as set forth in claim 13, the CPU, the second memory, the DMA controller, and the display controller being integrated on a single chip.

15. The GPS receiver as set forth in claim 9, wherein the first memory and the second memory are formed on separate blocks of RAM.

16. The GPS receiver as set forth in claim 9, wherein the first memory and the second memory are formed on a single block of RAM that is partitioned into first and portions.

* * * * *